US006753028B2

United States Patent
Iada et al.

(10) Patent No.: US 6,753,028 B2
(45) Date of Patent: Jun. 22, 2004

(54) METHOD FOR REMOVING ESSENTIAL OIL FROM INDUSTRIALLY-PRODUCED NON-CONCENTRATED ORANGE JUICE

(76) Inventors: Roberto Tacao Iada, Rua Marcos Monazzi, 1600, Matão-SP (BR); Kátia Casimiro, Av. Diogo Álvares, 1506, Campinas-SP (BR); Luis Roberto Pontes, Rua José Antonio Marinho, 87, Campinas-SP (BR)

(*) Notice: Subject to any disclaimer, the term of this patent is extended or adjusted under 35 U.S.C. 154(b) by 0 days.

(21) Appl. No.: 10/310,487

(22) Filed: Dec. 5, 2002

(65) Prior Publication Data

US 2003/0152680 A1 Aug. 14, 2003

(30) Foreign Application Priority Data

Dec. 12, 2001 (BR) .............................................. 0106301

(51) Int. Cl.$^7$ .............................................. A23L 1/222
(52) U.S. Cl. ....................... 426/386; 426/387; 426/599; 426/492; 426/494
(58) Field of Search ................................. 426/386, 387, 426/599, 492, 494

(56) References Cited

U.S. PATENT DOCUMENTS

| 2,573,699 | A | * | 11/1951 | Eskew et al. |
| 3,248,233 | A | * | 4/1966 | Brent et al. |
| 3,862,014 | A | * | 1/1975 | Atkins et al. |
| 4,534,991 | A | * | 8/1985 | Kryger |

* cited by examiner

Primary Examiner—Anthony Weier
(74) Attorney, Agent, or Firm—Cantor Colburn LLP

(57) ABSTRACT

A method for removing essential oil from industrially-produced non-concentrated orange juice wherein raw orange juice is submitted to a heat exchanger for heating, then directed to a vacuum chamber where vapors from the essential oil and other substances of the orange essence are produced and condensed wherein the liquid collected therein is subjected to a phase separation stage wherein an oily phase thus produced is removed and an aqueous phase is aggregated with the orange juice passing through the vacuum chamber.

3 Claims, 1 Drawing Sheet

Figure 1:
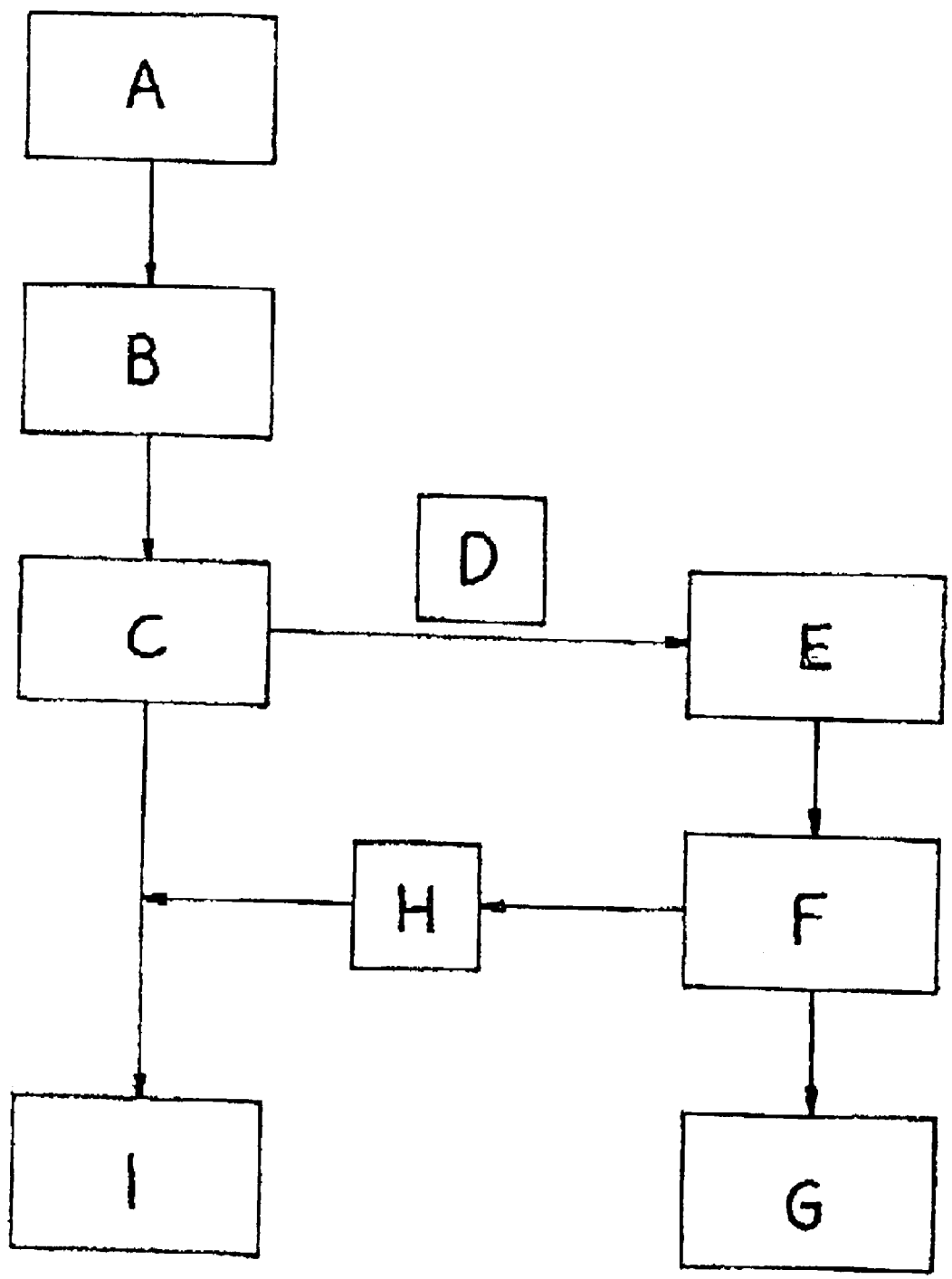

METHOD FOR REMOVING ESSENTIAL OIL FROM INDUSTRIALLY-PRODUCED NON-CONCENTRATED ORANGE JUICE

FIELD OF THE INVENTION

The present report refers to an invention patent treating of a method to allow oil removal from non-concentrated orange juice obtained through industrial processing, which method allows the contents of said essential oil to decrease to values lower than 0,033% v/v, a concentration above which the essential oil begins to change qualities of final product, that is, the orange juice.

DESCRIPTION OF THE RELATED ART

Large-scale orange juice production comprises processing of the fruit "in natura" through machines called extractors, which promote juice extraction by crushing the fruit as a whole, which operation produces, in addition to the own juice, a certain volume of essential oil derived from the fruit peel.

The essential oil should be removed from the orange juice with the maximum efficiency, since concentrations above 0,033% v/v, cause changes in taste, thereby causing a burning feeling at the mouth when consumed.

Thus, essential oil concentrations above 0,033% are considered harmful to quality of the final product, that is, the orange juice.

Two methods for removal of essential oil which are known today can be mentioned. In one of such methods, the separation principle occurs for difference of density between the aqueous means (juice) and the oily phase, by creating centrifugal forces generated through a rotor. In every equipment used in above-described method, called centrifuges, the less dense oily phase is separated from the aqueous phase (juice), such an oily phase being directed towards the center of the equipment, and the aqueous phase, which obviously is more dense, intended to the rotary field periphery thereof, the collection of both phases (aqueous and oily) being performed apart.

Centrifugal separation is effective provided that both oily and aqueous phases are physically and chemically integral and are not binding through the process called emulsification, which occurs when said aqueous and oily phases are firmly stirred or suffer some shearing processes which are usual during the passage of a liquid inside pumping tubes and systems.

Such a disadvantage restricts the scope of using centrifugal equipment for specific purposes.

Another method also pertaining to the state of technique makes use of vaporization and condensing technology, where condensing units which usually use pipe- and shell-typed heat exchanger, heat exchange equipment with quite higher equipment total volume/heat change area ratio are used.

The usual system to produce oil separation from orange juice according to the second above-described modality shows to be ineffective, mainly in respect of the heat exchange obtained from the present systems, and such a fact) together with the higher volume/dimension of heat exchangers/condensers, generate systems having larger dimensions, a great number of components and high degree of complexity.

SUMMARY OF THE INVENTION

Thus, one of the objectives of the present invention patent is providing a method for removing essential oil present in industrially-produced orange juice, which has as main characteristic to allow the extraction of said essential oil, upon use of phases reducing its concentration in orange juice to values lower than 0,033% v/v.

Another objective of this invention patent is providing a method for removing essential oil which is substantially simpler than the methods used today, in addition to promote removal of said substance without, however, interfering with desirable characteristics of the product, that is, its smell and compounds integrating orange essence.

DETAILED DESCRIPTION

In view of above-mentioned state of technique, and aiming to reach the objectives proposed, a method for removing essential oil, object of the present invention patent, has been developed, which will be described regarding FIG. 1, illustrating all stages of the method in question through a block diagram.

The method now proposed removes the excess essential oil present in a certain volume of industrially-produced non-concentrated orange juice, through unit equipment and operations.

Thus, and according to FIG. 1, it is possible to confirm that the proposed method comprises a first block indicated by reference A, and refers to the entrance of non-concentrated and raw orange juice into the removal plant.

Block A is followed by a second block, indicated by reference B, corresponding to a heat exchanger equipment receiving non-concentrated raw orange juice.

At block B heat exchanger, the first stage of the proposed method occurs, where the non-concentrated raw orange juice is heated at a temperature range from 55° C. to 75° C., and then, in a second stage, being directed towards a vacuum chamber indicated as block C at FIG. 1 diagram.

At the vacuum chamber C, vapors formed by water, volatile aromatic compounds and essential oil (indicated as block D of FIG. 1) are generated and removed, in a third stage, to a second plate heat exchange represented by block E, which in this case, acts as a condenser and merely as a condensed liquid cooler.

At block B condenser, vapors obtained through the vacuum chamber represented by block C are condensed and cooled preferably in a temperature range from 5° C. to 20° C., and sent, in a fourth stage of the method now described, to a decanting tank, represented by block F, which is the place where, in a fifth stage of the method, the condensed liquid is then separated into two different fractions, that is, one oily phase, composed by essential oil, as indicated by block G, which is removed from the process, thereby constituting the sixth stage of the method; and the other aqueous phase, indicated by block H, which is formed by orange essence.

H orange essence separated in the condensing tank, in a seventh stage of the present method, is directed again towards the process and aggregated to the volume of orange juice passing which passed through the vacuum chamber without suffering transformation in vapors D, thereby originating the final product (orange juice), which reaches the outlet point represented, in FIG. 1, by block I.

The final volume of orange juice which is already processed through the proposed method, can then pass to subsequent stages culminating with its bottling, which stages do not require any description, as it treats of a matter pertaining to state of technique.

The method now proposed shows to be more effective when compared with the methods in use today, since it promotes the separation of essential oil together with substances forming orange essence, thereby disposing in a subsequent stage, the fraction corresponding to oil, the orange essence aqueous fraction returning to the final product, without any loss of quality to the final product.

What is claimed:

1. A method for removing essential oil from industrially produced non-concentrated orange juice, the method comprising:

submitting a non-concentrated and raw orange juice to a heat exchanger, which heats at a temperature ranging between 55° C. and 75° C.;

submitting the non-concentrated and raw orange juice to a vacuum chamber;

producing vapors that are formed of essential oil and substances composing the an orange essence;

submitting the vapors to a second plate heat exchanger, which condenses the vapors into a liquid;

forwarding the liquid to a decanting tank;

inside the decanting tank, separating the liquid into two different phases, an oily phase formed by the essential oil, and an aqueous phase formed by the substances composing the orange essence; and returning the aggregating the aqueous phase to the non-concentrated orange juice, which passed by the vacuum chamber, thereby constituting a final product.

2. The method according to claim 1, further comprising removing the oily phase from the decanting tank.

3. The method according to claim 2, wherein the oily phase is used as a raw material or an aromatic product.

* * * * *